UNITED STATES PATENT OFFICE 2,185,632

BLEACHING SURFACES WITHOUT IMMERSION

Wilfred Bedggood Hill, Runcorn, and Bertram Pusey Ridge, Latchford, Warrington, England, assignors to Imperial Chemical Industries Limited, a corporation of Great Britain No Drawing. Application April 5, 1938, Serial No. 200,242. In Great Britain April 12, 1937

2 Claims. (Cl. 8—111)

This invention relates to improvements in bleaching surfaces which cannot easily be immersed in a bath of bleaching solution, and in particular to the bleaching of wood.

It is well known that hydrogen peroxide can be used as a bleaching agent, and among its many applications is that of bleaching wood. Solutions of hydrogen peroxide containing a small proportion of sodium silicate have also been used for this purpose.

This invention has as an object to devise an improved method of bleaching surfaces without immersion in a bleaching solution. A further object is to devise a method for bleaching surfaces of fibrous materials. A still further object is to devise an improved method of bleaching wood. Further objects are to devise methods for the bleaching of cardboard, fibre board and the like.

Further objects will appear hereinafter. These objects are accomplished by the following invention.

We have found that a surface, particularly a wooden surface, can be bleached in a more efficient manner than has hitherto been possible, by applying to the surface of the wood a recently prepared mixture of concentrated hydrogen peroxide and a solution of sodium silicate of such concentration that a gel gradually separates from the mixture and forms a mass of paste-like consistency. A mixture having these properties is capable of being used for the purpose of the invention either as a paste or in the liquid form. We find it preferable, however, to apply the mixture as the liquid and to allow the separation of the gel and the formation of the paste to take place on the surface being treated.

The invention is illustrated but not limited by the following example:

Example

A mixture was made up of equal volumes of 100-volume strength $H_2O_2$ and a sodium silicate solution of the following composition:

| | Parts by weight |
|---|---|
| $Na_2O$ | 13.9 |
| $SiO_2$ | 27.8 |
| $H_2O$ | 58.3 |

A board of deal was laid flat and the mixture spread over the surface by means of a brush. The board was then left, and at the end of an hour the silica gel formation could be detected. After several hours the liquid had entirely dried-up and was removed from the board by rubbing with a fine abrasive. An excellent bleached surface was obtained.

In preparing the mixture of hydrogen peroxide and sodium silicate wide variations in the concentrations of the hydrogen peroxide and sodium silicate solutions can be used. For example, we may use such an amount of hydrogen peroxide as will give a concentration of $H_2O_2$ in the mixture of between approximately 30 volume strength and 100 volume strength. We find it preferable, however, to use a mixture containing hydrogen peroxide of between 40 and 70 volume strength.

As the sodium silicate solution we have found it possible to use such as are commercially available as alkaline sodium silicates, for example, those in which the molecular ratio $SiO_2:Na_2O$ is about 1.8:1 to 2.2:1. Preferably we use such sodium silicate in which its ratio is 2.0:1.

Some wide variations in the strength of the silicate solution may be used; for example, we have used solutions from 1.4 to 1.6 specific gravity, but have found that it is more convenient to use a solution of 1.5 specific gravity, and also that we apparently obtain better results when using this strength. Thus, a suitable mixture is obtained by mixing equal volumes of 100 volume hydrogen peroxide solution and 100° Tw. sodium silicate solution containing silica and sodium oxide in the molecular ratio of 2:1. Such a mixture remains liquid for several hours, but on applying it to the wood surfaces gel formation commences within a short time.

If the surface to be bleached is vertical and cannot be placed flat, we can accelerate the gel formation by increasing the proportion of hydrogen peroxide in the mixture or by reducing the amount of silicate. Such acceleration of the gel formation permits the use of the mixture on a vertical surface. As an example, a mixture containing 75 parts of 130 volume hydrogen peroxide with 25 parts of 100° Tw. sodium silicate solution assumes a pasty condition very rapidly and is a suitable mixture to be applied to a vertical surface.

Conveniently, the mixture is left on the wood until it is dry, and is then removed by scraping or rubbing with a fine abrasive; in many cases it can be removed by mere rubbing or brushing with a stiff brush. It can also be removed while still in a paste-like condition, provided that bleaching has proceeded far enough.

With many woods one application of the bleaching mixture is sufficient. Some woods, e. g. oak, mahogany and teak, are more difficult to bleach, and two or even three coatings may be required to bring about the necessary whitening. Where more than one coating is to be given the previous coat may be removed before applying the next.

As many apparently widely different embodiments of this invention may be made without departing from the spirit and scope thereof, it is to be understood that we do not limit ourselves to the specific embodiments thereof except as defined in the appended claims.

We claim:

1. A method of bleaching a surface which comprises applying thereto while in a liquid condition a bleaching agent which will gel to a paste-like consistency and consisting of a mixture of sodium silicate of a strength between 80° Tw. and 120° Tw., and hydrogen peroxide, the molecular ratio of silica to sodium oxide in the sodium silicate solution being between 1.8 to 1 and 2.2 to 1, said mixture having a concentration of hydrogen peroxide between 30 volume and 100 volume strength.

2. A method of bleaching a surface which comprises applying thereto while in a liquid condition a bleaching agent which will gel to a paste-like consistency and consisting of a mixture of sodium silicate of a strength between 80° Tw. and 120° Tw., and hydrogen peroxide, the molecular ratio of silica to sodium oxide in the sodium silicate solution being between 1.8 to 1 and 2.2 to 1, said mixture having a concentration of hydrogen peroxide between 40 volume and 70 volume strength.

WILFRED BEDGGOOD HILL.
BERTRAM PUSEY RIDGE.